United States Patent
Li et al.

(10) Patent No.: US 12,432,079 B2
(45) Date of Patent: Sep. 30, 2025

(54) PARTICIPANT SORTING IN VIDEO CONFERENCING

(71) Applicant: Hewlett-Packard Development Company, L.P., Spring, TX (US)

(72) Inventors: Pei Hsuan Li, Spring, TX (US); Rose Hedderman, Spring, TX (US); Sarah Shiraz, Spring, TX (US); Yu Chun Huang, Spring, TX (US)

(73) Assignee: Hewlet-Packard Development Company, L.P., Spring, TX (US)

( * ) Notice: Subject to any disclaimer, the term of this patent is extended or adjusted under 35 U.S.C. 154(b) by 324 days.

(21) Appl. No.: 18/183,053

(22) Filed: Mar. 13, 2023

(65) Prior Publication Data
US 2024/0313990 A1 Sep. 19, 2024

(51) Int. Cl.
H04L 12/18 (2006.01)
G06V 10/82 (2022.01)
G06V 40/16 (2022.01)

(52) U.S. Cl.
CPC .......... H04L 12/1818 (2013.01); G06V 10/82 (2022.01); G06V 40/176 (2022.01)

(58) Field of Classification Search
CPC ..... H04L 12/1813–1822; H04L 65/403; H04L 65/4038; H04L 65/4046; H04L 65/4053; H04L 65/40; G06V 40/174–178
See application file for complete search history.

(56) References Cited

U.S. PATENT DOCUMENTS

| | | | |
|---|---|---|---|
| 10,599,917 | B1 | 3/2020 | Shaburov et al. |
| 11,010,600 | B2 | 5/2021 | Qing et al. |
| 2014/0098986 | A1* | 4/2014 | Harrington ............. G11B 27/11 382/100 |
| 2015/0256634 | A1* | 9/2015 | Bastide ................. H04L 67/306 709/204 |
| 2018/0315418 | A1* | 11/2018 | Bolsakovas ............. G10L 25/48 |
| 2019/0088270 | A1* | 3/2019 | Malur Srinivasan ........................ A61B 5/7264 |
| 2019/0174096 | A1* | 6/2019 | Harpur ................. G06V 40/174 |
| 2019/0311188 | A1* | 10/2019 | Qing ..................... G06V 10/82 |

(Continued)

FOREIGN PATENT DOCUMENTS

| | | |
|---|---|---|
| WO | 2021/230675 A1 | 11/2021 |
| WO | 2022/111236 A1 | 6/2022 |

OTHER PUBLICATIONS

Avanija, et al., "Facial Expression Recognition using Convolutional Neural Network", 2022 First International Conference on Artificial Intelligence Trends and Pattern Recognition (ICAITPR), Hyderabad, India, 2022, pp. 1-7 (Year: 2022).*

Primary Examiner — Jonathan A Bui
(74) Attorney, Agent, or Firm — Quarles & Brady LLP

(57) ABSTRACT

An example non-transitory machine-readable storage medium comprising instructions executable by a processing resource of a computing device to cause the computing device to: receive a video feed of a participant in a video conference; identify the participants within the video feed; determine a probability that a characteristic is being experienced by the participant; determine a relevancy score of the participant based on the probability that the characteristic is being experienced by the participant; and display the participant relative to other participants in the video conference based on the relevancy score.

19 Claims, 10 Drawing Sheets

(56) References Cited

U.S. PATENT DOCUMENTS

| | | | | |
|---|---|---|---|---|
| 2021/0076002 A1* | 3/2021 | Peters | ................... | H04N 7/152 |
| 2021/0400237 A1* | 12/2021 | Amiri | ..................... | H04N 7/15 |
| 2022/0086393 A1* | 3/2022 | Peters | ................... | H04N 7/147 |
| 2022/0400022 A1* | 12/2022 | Desai | ................... | G06V 40/107 |
| 2024/0111957 A1* | 4/2024 | Chung | ................... | G06F 40/30 |

* cited by examiner

PARTICIPANT SORTING IN VIDEO CONFERENCING

BACKGROUND

Video conferencing systems may be used to facilitate meetings in a virtual space. Meetings may include a variety of participants with roles, such as speaker, listener, and/or audience member. Within the interface of the video conferencing system, participants may be presented in a gallery mode. This allows participants to view other participants to the meeting.

BRIEF DESCRIPTION OF THE DRAWINGS

Various features will now be described with reference to the following drawings. Throughout the drawings, reference numbers may be re-used to indicate correspondence between referenced elements. The drawings are provided to illustrate examples described herein and are not intended to limit the scope of the disclosure.

DETAILED DESCRIPTION

Figure 1:
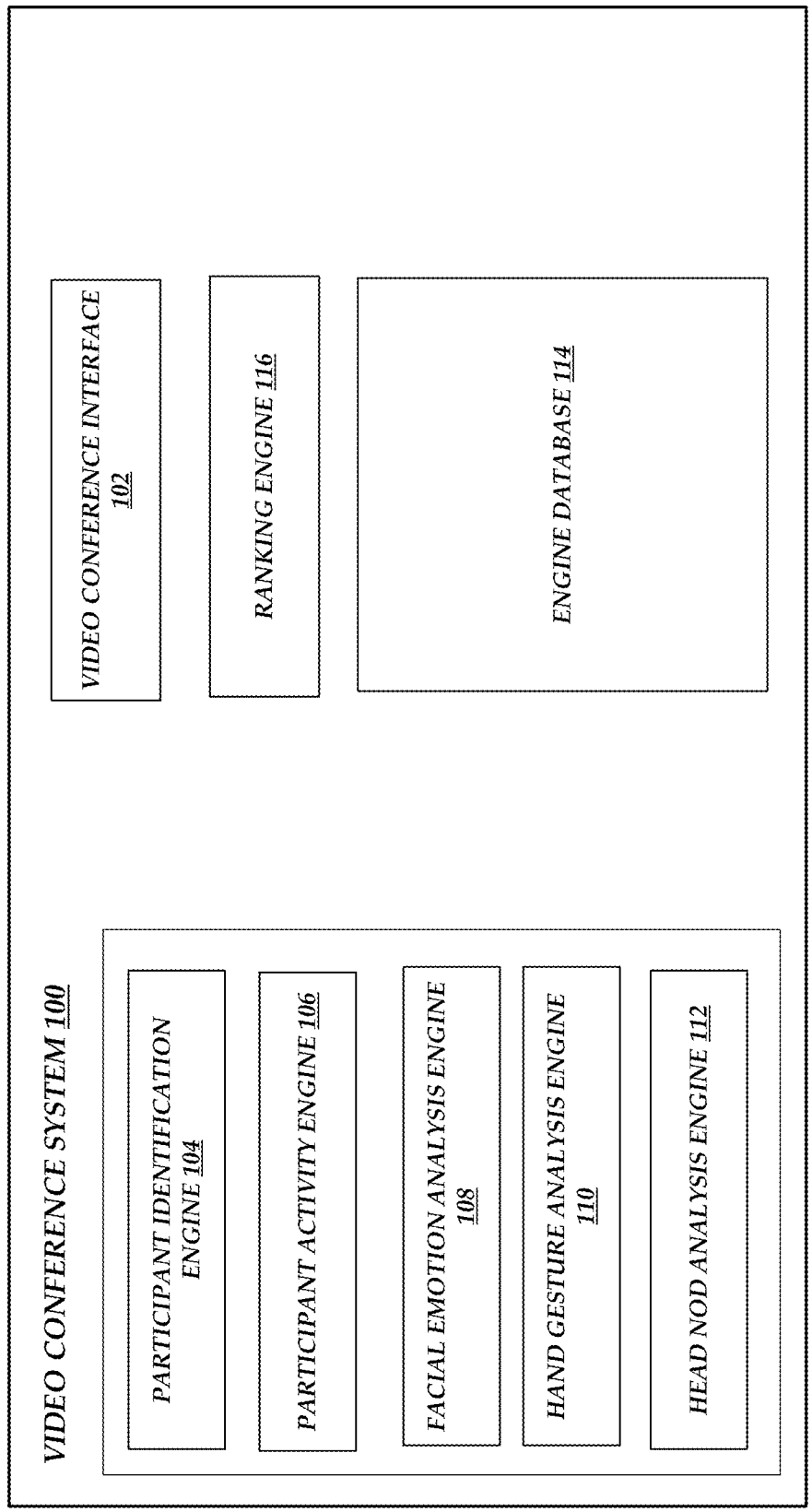
FIG. 1 is a block diagram illustrating an example video conference system.

Video conferencing systems can be to automatically sort participants in the gallery view of the video conference interface. In a common application, the video conference system may sort participants based on participation and/or activity, such as by moving participants who are unmuted, or have their hands raised, to the front of the gallery. However, there are a plurality of non-verbal cues that may be indicative of a participant's level of interest in a video conference. It would be helpful for a video conferencing system to be able to identify non-verbal cues, such as emotions and gestures, in order to efficiently sort and filter participants in the video conference interface.

The ability to gauge audience reaction in essential in any form of communication. For example, an audience listening to a speaker may give feedback to indicate the level of interest in the topic of discussion. Feedback may be conscious or not conscious, verbal or not verbal. In response, the speaker may change the course of discussion based on perceived reactions to ensure effective communication.

However, virtual communication may present limitations on gauging audience emotion. Especially within a video conferencing environment in which participants may be off camera, muted, and/or not readily visible in the gallery, presenters and speakers may feel unsupported without non-verbal cues or gestures indicating agreement. This may place stress on the presenter and hinder them from communicating effectively.

In addition, based on the context and role of a participant in a call, the participant may have different preferences based on the type of audience response. For example, a presenter or active speaker might prefer to see positive feedback from the audience, such as smiling or nodding. On the other hand, the presenter might prefer to see other important nonverbal cues and emotions, such as confusion, which may indicate to the speaker that they may need to further clarify the message. A participant to the video conference who is an audience member, however, may find it relevant to see others who are experiencing similar emotions as the participants. For example, a nodding audience participant may prefer to see other participants who are nodding, rather than participants who are shaking their heads.

Examples of the present disclosure relate to a system of participant sorting in a video conference based on perceived characteristics. For example, the system may monitor and analyze the participants for certain characteristics, such as facial expressions, body language, head gestures, hand gestures, biometrics, etc. The system may further sort and pin the most relevant participants so that they are visible to a speaker or presenter.

In some examples, the techniques described herein relate to a non-transitory machine-readable storage medium comprising instructions executable by a processing resource of a computing device to cause the computing device to: receive a video feed of a participant in a video conference; identify the participants within the video feed; determine a probability that a characteristic is being experienced by the participant; determine a relevancy score of the participant based on the probability that the characteristic is being experienced by the participant; and display the participant relative to other participants in the video conference based on the relevancy score.

In some examples, the techniques described herein relate to a non-transitory machine-readable storage medium, wherein the machine-readable storage medium further comprises instructions to cause the computing device to identify the participant using a multi-cascaded convolutional neural network (MTCNN).

In some examples, the techniques described herein relate to a non-transitory machine-readable storage medium, wherein the machine-readable storage medium further comprises instructions to cause the computing device to determine the probability using a convolutional neural network (CNN).

In some examples, the techniques described herein relate to a non-transitory machine-readable storage medium, wherein the characteristic is selected from the group consisting of: an emotion and a level of engagement.

In some examples, the techniques described herein relate to a non-transitory machine-readable storage medium, wherein the characteristic is an emotion corresponding to a state of boredom, tiredness, excitement, interest, anger, disgust, fear, happiness, sadness, surprise, or apathy, of the participant.

In some examples, the techniques described herein relate to a non-transitory machine-readable storage medium, wherein the instructions cause the computing device to determine the probability using facial emotional analysis.

In some examples, the techniques described herein relate to a non-transitory machine-readable storage medium, wherein the instructions cause the computing device to determine the probability using hand gesture recognition.

In some examples, the techniques described herein relate to a non-transitory machine-readable storage medium, wherein the instructions cause the computing device to determine the probability using head motion recognition.

In some examples, the techniques described herein relate to a non-transitory machine-readable storage medium, wherein the instructions cause the computing device to determine a relevancy score of the participant based on the probability, a sorting criterion, and a weight value.

In some examples, the techniques described herein relate to a non-transitory machine-readable storage medium, wherein the sorting criterion corresponds to a similar characteristic experienced by the other participants in the video conference.

In some examples, a non-transitory machine-readable storage medium comprising instructions executable by a processing resource of a computing device to cause the computing device to: receive a probability that a characteristic is being experienced by a participant present in a video conference; receive a sorting criterion associated with a characteristic; determine a relevancy score of the participant using the probability and the sorting criterion; and rank the participant relative to other participants in the video conference based on the relevancy score.

In some examples, the techniques described herein relate to a non-transitory machine-readable storage medium, wherein the characteristic is selected from the group consisting of: an emotion and a level of engagement.

In some examples, the techniques described herein relate to a non-transitory machine-readable storage medium, wherein the characteristic is an emotion corresponding to a state of boredom, tiredness, excitement, interest, anger, disgust, fear, happiness, sadness, surprise, or apathy, of the participant.

In some examples, the techniques described herein relate to a non-transitory machine-readable storage medium comprising instructions executable by a processing resource of a computing device to cause the computing device to: determine probabilities of characteristics being experienced by a set of participants in a video conference, wherein a distinct probability is determined for each participant of the set of participants; determine a list of characteristics based on the probabilities and a threshold value; sort the list of characteristics; and display a set of characteristics from the sorted list.

In some examples, the techniques described herein relate to a non-transitory machine-readable storage medium, wherein the characteristic is selected from the group consisting of: an emotion and a level of engagement.

In some examples, the techniques described herein relate to a non-transitory machine-readable storage medium, wherein the characteristic is an emotion corresponding to a state of boredom, tiredness, excitement, interest, anger, disgust, fear, happiness, sadness, surprise, or apathy, of a participant.

In some examples, the techniques described herein relate to a non-transitory machine-readable storage medium, wherein the instructions further cause the computing device to receive a selection of a characteristic from the set of characteristics.

In some examples, the techniques described herein relate to a non-transitory machine-readable storage medium, wherein the instructions further cause the computing device to display the set of participants in an order based upon the selection.

In some examples, the techniques described herein relate to a non-transitory machine-readable storage medium, wherein the instructions further cause the computing device to display a characteristic of the sorted list corresponding to a characteristic most likely being experienced by the largest number of participants in the video conference.

In some examples, the techniques described herein relate to a non-transitory machine-readable storage medium, wherein the instructions further cause the computing device to display a characteristic occurring most frequently in the sorted list.

FIG. 1 is a block diagram illustrating an example video conference system 100. Video conference system 100 may refer to any conference and/or meeting conducted in a virtual space. For example, video conference system 100 may connect participants and their corresponding devices to the meeting via a network. Video conference system 100 and the various components as illustrated in FIG. 1 may be implemented on any device to host, attend, participate in, or otherwise connect to the video conference system 100. Components of video conference system 100 may also be stored and/or implemented on remote devices or remote storage and accessible via a network. Implementations of video conference system 100 and included components relate to a system of participant sorting in a video conference based on perceived characteristics.

As illustrated in FIG. 1, video conference system 100 includes video conference interface 102. Video conference interface 102 may include any content of video conference system 100 as displayed on a device connected to video conference system 100. In an example, video conference interface 102 may include video feeds of participants connected to the video conference system 100. The images of participants may be arranged and displayed in any order within the video conference interface 102. The arrangement and display of participants as shown within the video conference interface 102 may vary between each participant's device.

As illustrated, video conference system 100 includes participant identification engine 104. Participant identification engine 104 may be to identify a participant within the corresponding video feed. For example, participation identification engine 104 may utilize face detection within the video feed to generate a bounding box of the identified face(s). In some examples, participation identification engine 104 may utilize convolutional networks to identify a participant's face (e.g., multi-task cascaded convolutional networks (MTCNN)). Participation identification engine 104 may reference engine database 114 in identifying participant face(s). Reference database storage may be located locally, such as on a participant's device, or remotely, such as on a server, and accessible via a network.

Video conference system 100 may include various analysis engines that perform analysis on participants once identified by the participant identification engine 104. For example, analysis engines may include a participant activity engine 106, a facial emotional analysis engine 108, a hand gesture analysis engine 110, and a head nod analysis engine 112. Other engines not illustrated in FIG. 1 may be included within video conference system 100 to perform other participant characteristic analyses.

Participant activity engine 108 may perform analysis of a participant's activity as occurring within the video conference system 100. For example, the participant activity engine 108 may note when a participant speaks, is muted, turns their camera on/off, raises their hand, presents content, shares their screen, send a message in the chat, etc.

Facial emotion analysis engine 108 may be to perform emotional analysis of a participant's face. For example, facial emotion analysis engine 108 may utilize convolutional neural networks (CNNs) in order to predict a participant's emotions. In utilizing CNNs and/or other neural networks, the emotional analysis engine 108 may reference the database storage 114. Database storage 114 may include Deep-Face libraries and other resources.

In some examples, facial emotion analysis engine 108 may utilize a CNN to generate a percentage of predicted emotions of a participant in a video feed. The facial emotion analysis engine 108 may conduct an analysis of a participant's facial emotions and output a matrix of predicted emotions as percentages. In some examples, the output of predicted emotions may include a dominant emotion. An example output by the facial emotion analysis may include: {'emotion': {'angry': 4.476e-06, 'disgust': 1.638e-06, 'fear': 0.000127, 'happy': 99.0639, 'sad': 0.02293, 'surprise': 3.946e-06, 'neutral': 0.9129}, 'dominant_emotion': 'happy'}.

Hand gesture analysis engine 110 may perform analysis of a participant's hand gestures. The hand gesture analysis engine 110 may recognize different gestures or postures in which that the participant places their hands and associate different gestures with emotions. For example, a participant who holds their hands under their chin may be perceived by hand gesture analysis engine 110 as "interested" or "engaged," whereas a participant crossing their arms may be perceived as "angry" or "bored."

Hand gesture analysis engine 110 may utilize neural networks (e.g., CNNs) in predicting emotions based on a participant's hand gestures and may reference the database storage 114 for reference values and libraries. In some examples, the hand gesture analysis engine 110 may utilize a CNN to generate a percentage of predicted emotions of a participant in a video feed based on their hand gestures. The hand gesture analysis engine 110 may output a matrix of predicted emotions as percentages. In some examples, the output of predicted emotions may include a dominant emotion.

Head nod analysis engine 112 may perform analysis of a participant's head nodding in identifying whether the participant is taking an interest in the video conference system 100. The head nod analysis engine 112 may recognize head gestures, such as nodding, and associate the gestures with emotions. For example, a participant who is nodding their head slowly may be perceived by head nod analysis engine as "interested."

Head nod analysis engine 112 may utilize various mapping pattern methods, such as optical flow, to recognize a participant's head nod. For example, the head nod analysis engine 112 may track the participant's face movement for several frames and determine that the participant is nodding if there is sufficient face movement along the y-axis. Head nod analysis engine 112 may utilize neural networks (e.g., CNNs) in predicting emotions based on a participant's hand gestures and may reference the database storage 114 for reference values and libraries. In some examples, the head nod analysis engine 112 may utilize a CNN to generate a percentage of predicted emotions of a participant in a video feed based on their hand gestures. The head nod analysis engine 112 may output a matrix of predicted emotions as percentages. In some examples, the output of predicted emotions may include a dominant emotion.

Although not shown, the video conference system 100 may include other analysis engines that may perform of additional attributes of the identified participant, such as analysis related to gender, age, race, etc.

As illustrated, video conference system 100 includes ranking engine 116. Ranking engine 116 may be to determine a ranking of each participant, which may be used to update the arrangement of the participants' video feeds as displayed in the video conference interface 102.

Ranking engine 116 may take into account a sorting criterion in determining the ranking of each participant. The sorting criterion may be provided by a participant to the video conference system 100, and includes a preferred characteristic, a preferred order, or any other criterion relevant to a ranking of the participants. For example, a participant may provide a sorting criterion that relates to a preferred "happy" emotion. In that case, the ranking engine may rank the participants from the happiest participant to the least-happy participant.

The ranking of each participant may be score-based. Ranking engine 116 may determine a ranking of the participants based on a relevancy score corresponding to each participant. For example, a relevancy score may be determined, calculated, generated, or be otherwise provided for each participant in the video conference system 100 and is based on the output of the analysis engines and the sorting criterion. For example, if the sorting criterion is activity based (i.e., most engaged to least engaged), the ranking engine 116 will assign a higher score to participants perceived to have a higher activity level than participants with a lower activity level.

In some examples, the ranking engine 116 may determine the relevancy scores for each participant at predetermined intervals. In this example, the ranking engine 116 may determine the relevancy scores at each frame of the video feeds of the participants and output a relevancy score based on the moving weighted average of the relevancy scores of the frames that occurred within the predetermined interval (e.g., 10 seconds, 20 seconds).

The relevancy score, and ultimately the ranking as determined by ranking engine 118, may be used in determining the arrangement (i.e., sorting) of the video feeds of the participants within video conference interface 102. For example, as noted above, an activity-based sorting criterion may prompt the ranking engine to determine a ranking of participants from most-engaged to least engaged. Accordingly, the video feeds of the participants may be arranged in an order corresponding to the ranking.

Figure 2:
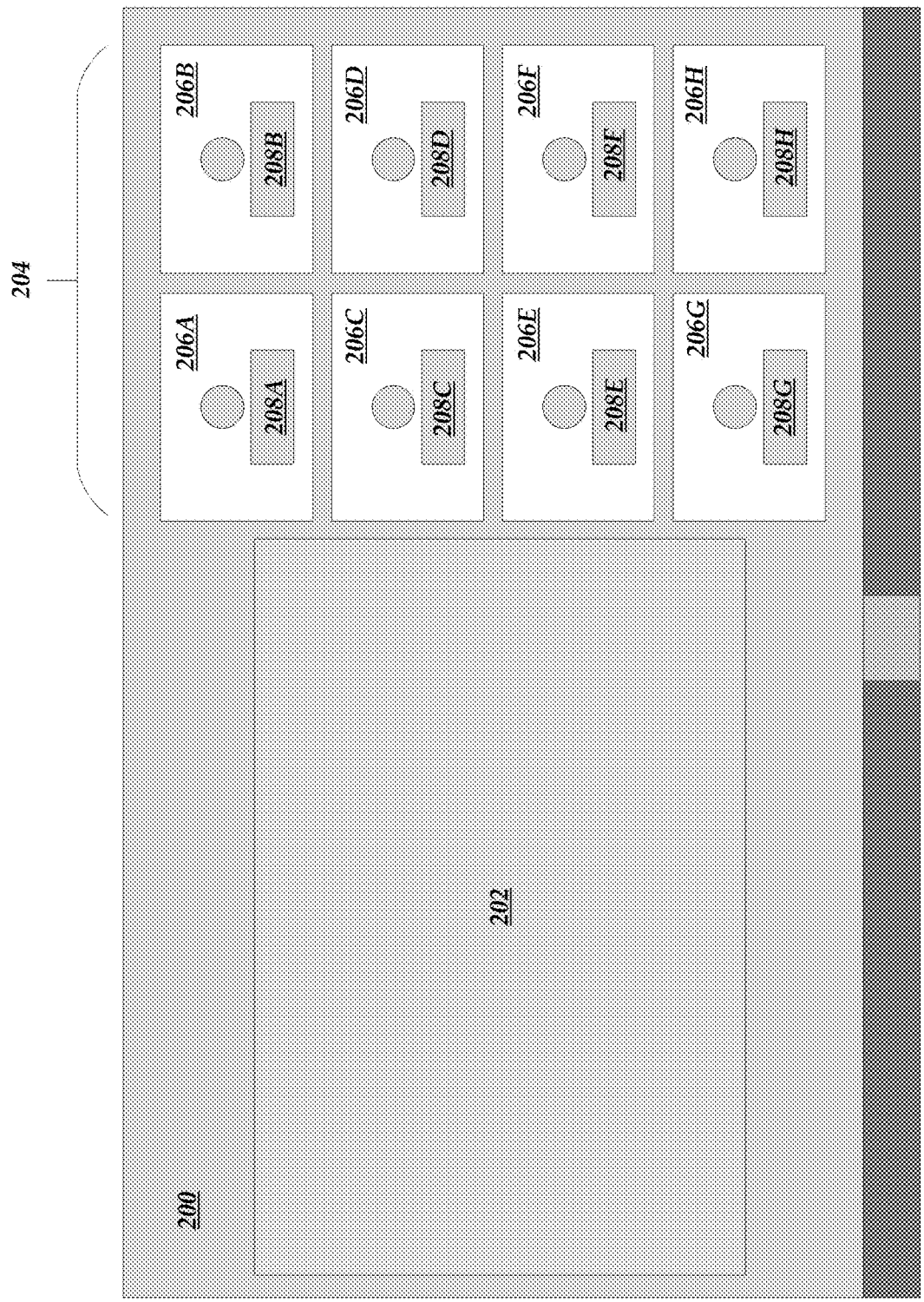
FIG. 2 is a block diagram illustrating an example video conference interface.

FIG. 2 is a block diagram illustrating an example video conference interface corresponding to a video conference system 100.

As illustrated, video conference interface 200 includes presentation 202 and gallery 104. Presentation 202 may include any content associated with video conference system 100. For example, presentation 202 may include a shared screen, a whiteboard, a video, an image, a stream, other shared content, etc. In some examples, video conference interface 200 does not include presentation 202.

As illustrated, gallery 204 includes participants 208 to the video conference interface 200. For example, participant 208A may appear within participant video feed 206A. Video conference interface 200 may include any number of participants including 208A-208H. Video conference interface 200 may also include any number of corresponding participant video feeds including 206A-206H. In some examples, gallery 204 may appear on the right side of presentation 202, as shown, or in any other location within video conference interface 200.

Figure 3:
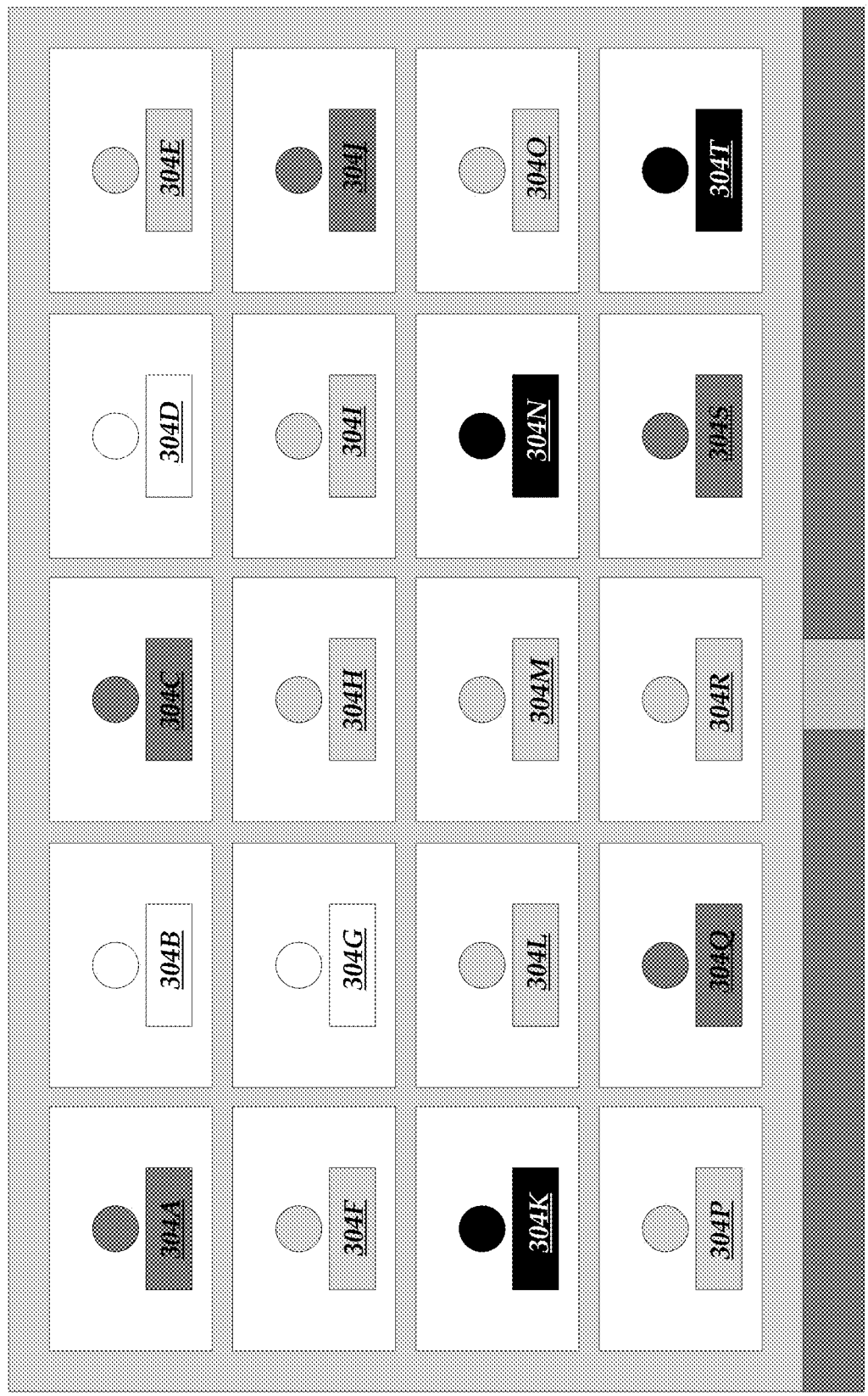
FIG. 3 is a block diagram illustrating an example gallery view of the video conference interface.

FIG. 3 is a block diagram illustrating an example extended gallery view 204 of the video conference interface. Extended gallery view 204 includes participants 304A-304T arranged in a 5×4 array configuration. In some examples, gallery view 204 includes more or less participants depending on the number of participants to video conference system 100. In some examples, gallery view 204 may be scrolled to show additional participants.

Participants to video conference system 100 may exhibit a wide range of characteristics, as indicated by the varying shades of participants 304. Characteristics of the participants 304 may include emotions, engagement levels, etc. For example, participant emotions may include a state of boredom, tiredness, excitement, interest, anger, disgust, fear, happiness, sadness, surprise, or apathy, etc. Engagement levels may correspond to a level of interest and/or activity with regard to the video conference. For example, a participant who is nodding smiling, or raising their hand may have a higher engagement level than a participant who is perceived to be sleeping or yawning. Although not shown in FIG. 3, engagement levels may also correspond to a participant's actions with respect to the video conference system 100, such as muting or turning their camera off.

Figure 4:
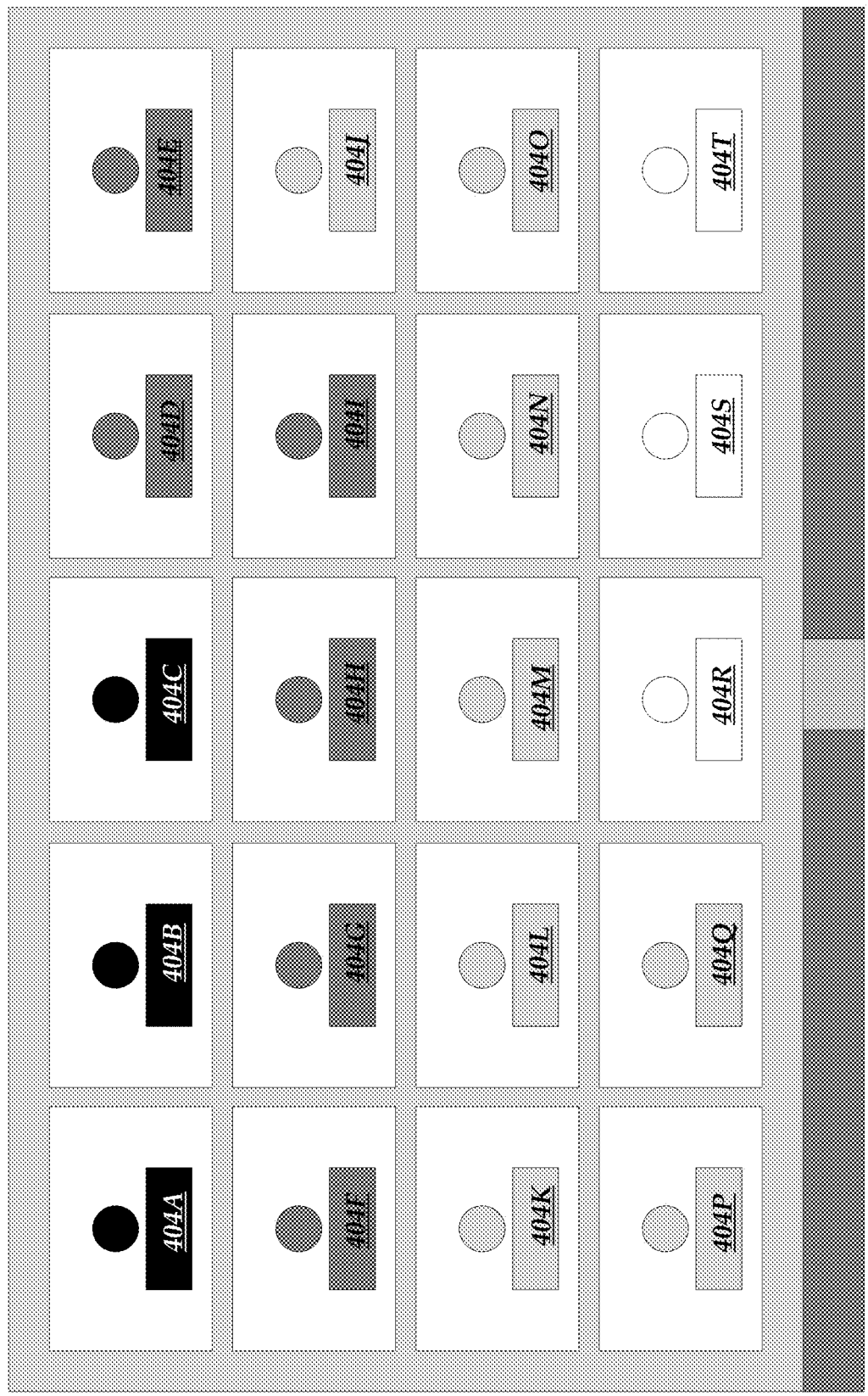
FIG. 4 is a block diagram illustrating a sorted gallery view of the video conference interface.

FIG. 4 is a block diagram illustrating an example extended gallery 204 that is sorted according to an engagement-based and/or activity-based sorting criterion. According to the processes and methods of the system as described in FIG. 1, the participants 404A-404T may be scored and ranked based on the level of engagement. As shown, the shade of the participant demonstrates the magnitude of the score. In this case, participant 404A represents the highest scoring participant and appears in the topmost left corner as the darkest shade. Participant 404T, on the other hand, represents the lowest scoring participant and appears in the bottommost right corner as the lightest shade. The intervening participants 404B-404S may appear in the order of descending scores, as demonstrated by the gradient of shades. Although the location of the highest-ranking participant at the topmost-left and lowest-ranking participant at the bottommost-right is demonstrated in FIG. 4, other locations and directions indicating a ranking of participants is possible.

Figure 5:
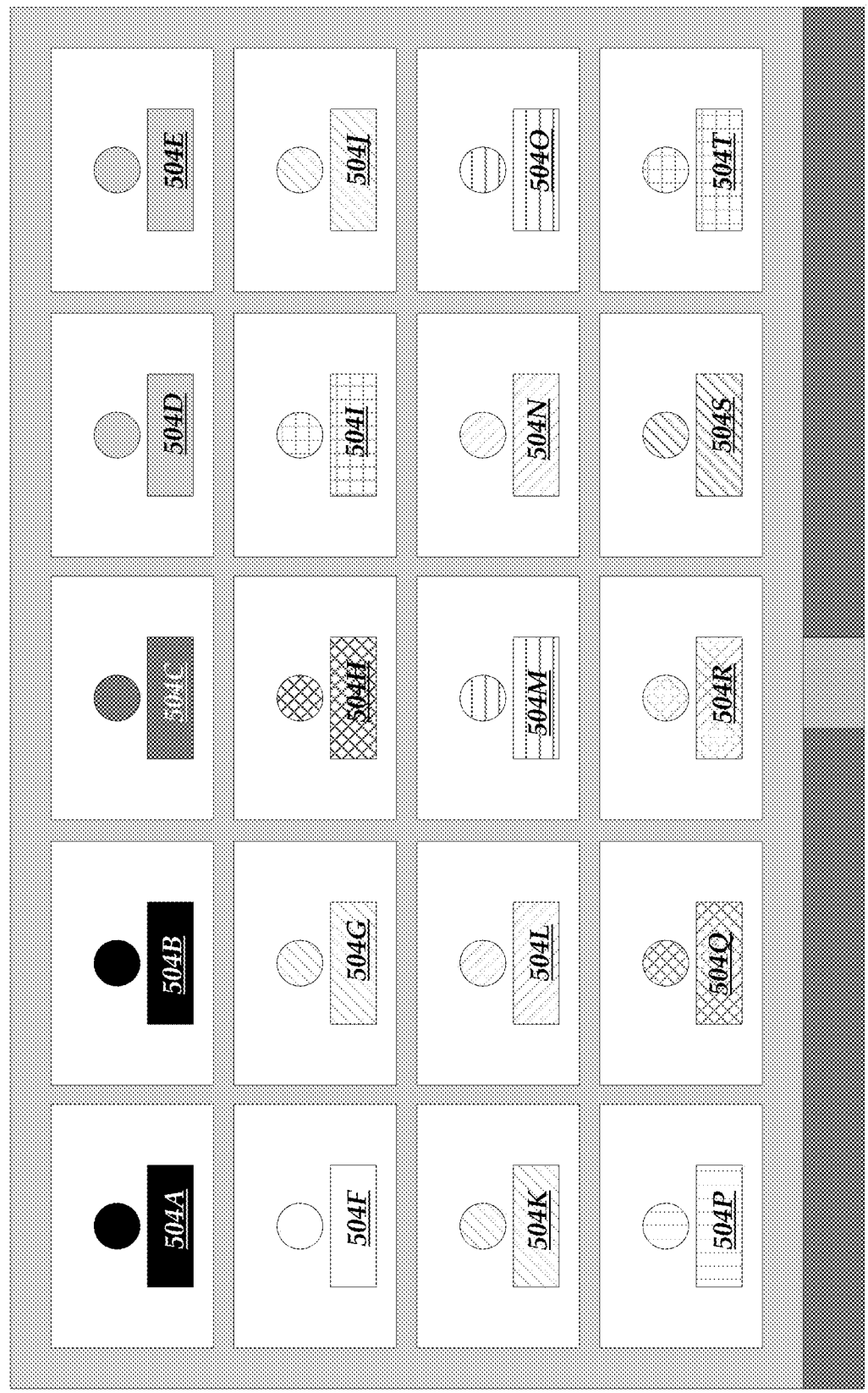
FIG. 5 is a block diagram illustrating a filtered gallery view of the video conference interface.

FIG. 5 is a block diagram illustrating an example extended gallery 204 that is sorted according to a preferred characteristic sorting criterion. According to the processes and methods of the system as described in FIG. 1, the participants 404A-404T may be scored and ranked based on the preferred characteristic. As illustrated, solid-shaded participants 504A-504F correspond to participants who have been perceived to exhibit preferred characteristic. Participants 504A-504F are scored and ranked based on the preferred characteristic, in which participant 304A is the highest-scored participant and participant 504F is the lowest-scoring participant. For example, if the preferred characteristic is "happy," participants 504A-504F are determined to exhibit some degree of happiness. Remaining participants 504G-504T, demonstrated by the patterned shades, may correspond to participants who do not exhibit the preferred characteristic, or do so to a negligible degree. As shown, participants 504G-504T are randomly arranged.

Figure 6:
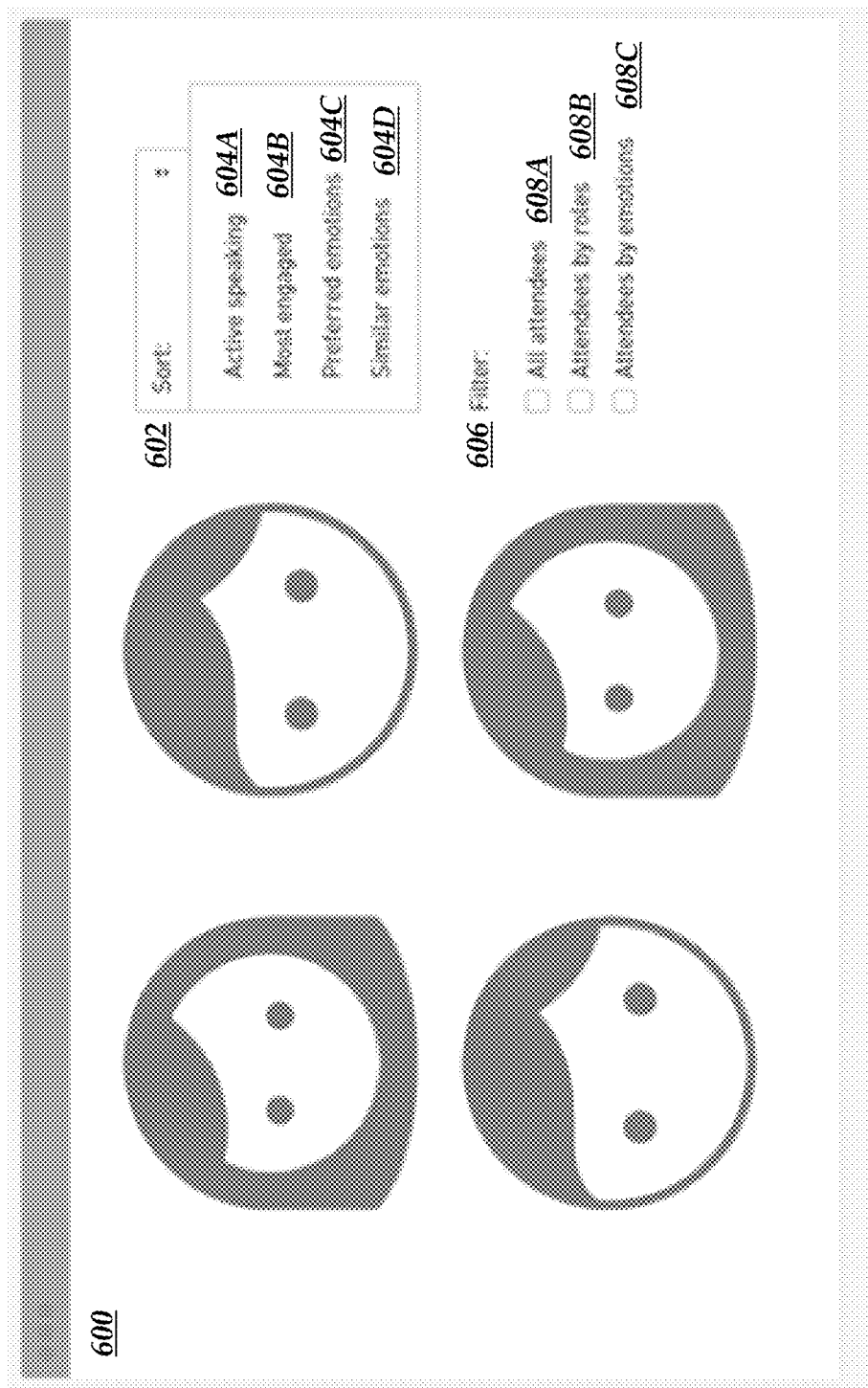
FIG. 6 is a block diagram illustrating an example sorting interface.

FIG. 6 illustrates an example interface for selection and/or modification of a sorting criterion. As illustrated, sorting criterion interface 600 may include a sorting menu 602 and filter menu 606.

Sorting menu 502 may include any sorting criterion relevant to the arrangement and selection of the participants to video conference system 100. For example, sorting criterion 604A-604D may include: active speaking, most engaged, preferred emotions, similar emotions. "Active speaking" sorting criterion 604A may correspond to a preference for sorting participants based on whether participants are actively unmuted and speaking during video conference system 100. "Most engaged" sorting criterion 604B may correspond to a preference for sorting participants based on the level of activity, such as raising hands, chatting, nodding, etc. "Preferred emotions" sorting criterion 604C may correspond to a preference for sorting participants based on a preferred emotion. "Similar emotions" sorting criterion may correspond to a preference for sorting participants based on a participant's own emotion. Sorting criterion 604 may be displayed within the sorting criterion interface 600.

Filter menu 606 may include any filtering criterion relevant to the arrangement and selection of the participants to video conference system 100. For example, filtering criterion may include: all attendees, attendees by roles, attendees by emotions. "All attendees" filtering criterion 608A may correspond to a preference for viewing all the participants, without filtering any. "Attendees by roles" filtering criterion 608B may correspond to a preference for viewing the participants based on their roles in the video conference system 100. For example, roles may be assigned to each participant based on their level of engagement, such as speaker, audience member, etc. Similar to the sorting criterion above, the "attendees by emotions" filtering criterion 608C may correspond to a preference for viewing participants based on a specified emotion.

Figure 7:
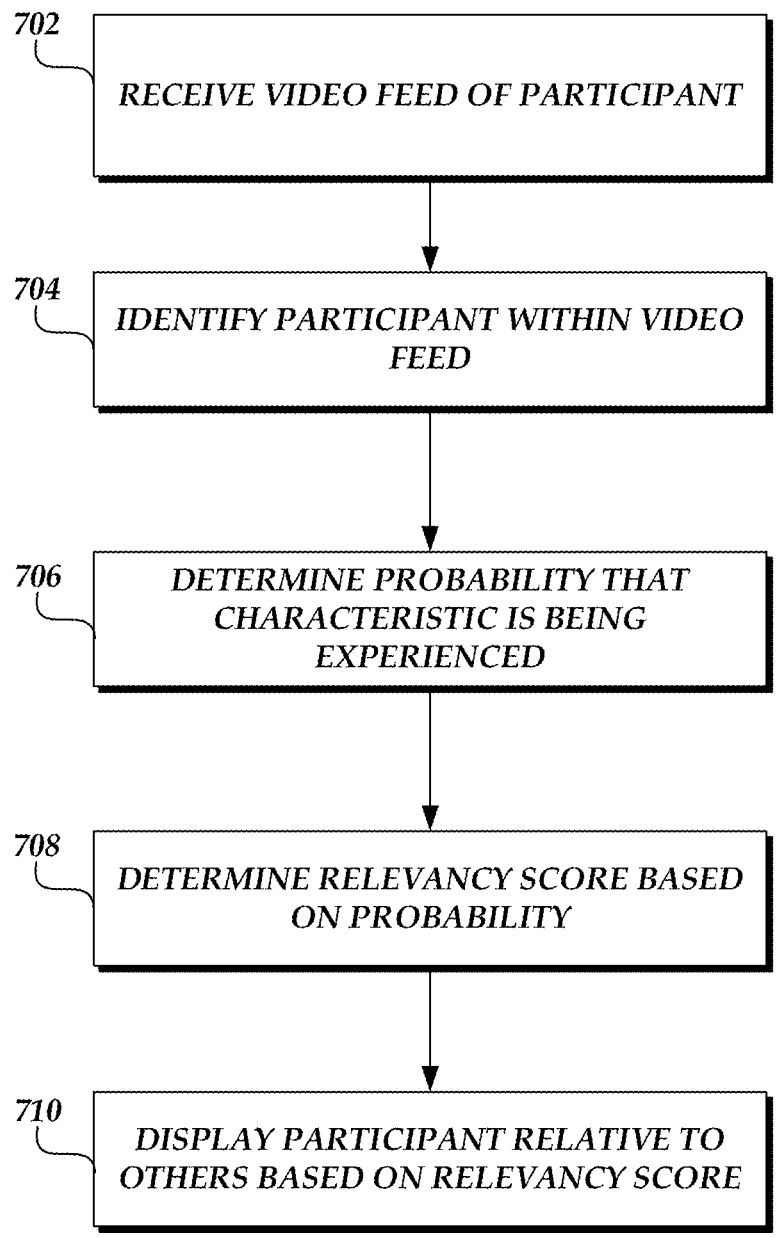
FIG. 7 is a flow diagram depicting an example routine for participant analysis and sorting within a video conference.

FIG. 7 is a flow diagram depicting an example routine for participant sorting and ranking within a video conference system 100. Routine 700 may be implemented by a computing device connected to video conference system 100.

At block 702, the computing device receives a video feed of a participant in a video conference. Video conference system 100 may refer to any conference and/or meeting conducted in a virtual space. For example, video conference system 100 may connect participants and their corresponding devices to the meeting via a network.

At block 704, the computing device identifies the participant within the video feed. The computing device may utilize face detection to identify a participant's face. In some examples, the computing device identifies the participant using convolutional neural networks, such as MTCNN. In identifying the participant within the video feed, the computing device may access a reference value database that can be stored locally, such as on the computing device, or remotely, such as a server, and accessible via a network.

At block 706, the computing device determines a probability that a characteristic is being experienced by the participant.

In some examples, the characteristic may be an emotion or a level of engagement. A level of engagement may correspond to a participant's level of interaction and participation within the video conference. Emotions may correspond to a state of boredom, tiredness, excitement, interest, anger, disgust, fear, happiness, sadness, surprise, or apathy, of the participant.

In some examples, a probability that a characteristic is being experienced by the participant corresponds to a percentage that the characteristic is perceived to be exhibited by the participant.

In some examples, the computing device may utilize CNNS in determining the probability.

In some examples, the computing device may determine the probability that a characteristic is being experienced by the participant using facial emotional analysis. In some examples, the computing device may determine the probability that a characteristic is being experienced by the participant using hand gesture recognition. In some examples, the computing device may determine the probability that a characteristic is being experienced by the participant using head motion recognition.

At block 708, the computing device determines a relevancy score of the participant based on the probability that the characteristic is being experienced by the participant. In some examples, the relevancy score of the participant may be determined based on the probability, a sorting criterion, and a weight value. In some examples, the sorting criterion corresponds to a similar characteristic experienced by the other participants in the video conference.

At block 710, the computing device displays the participant relative to other participants in the video conference based on the relevancy score.

Figure 8:
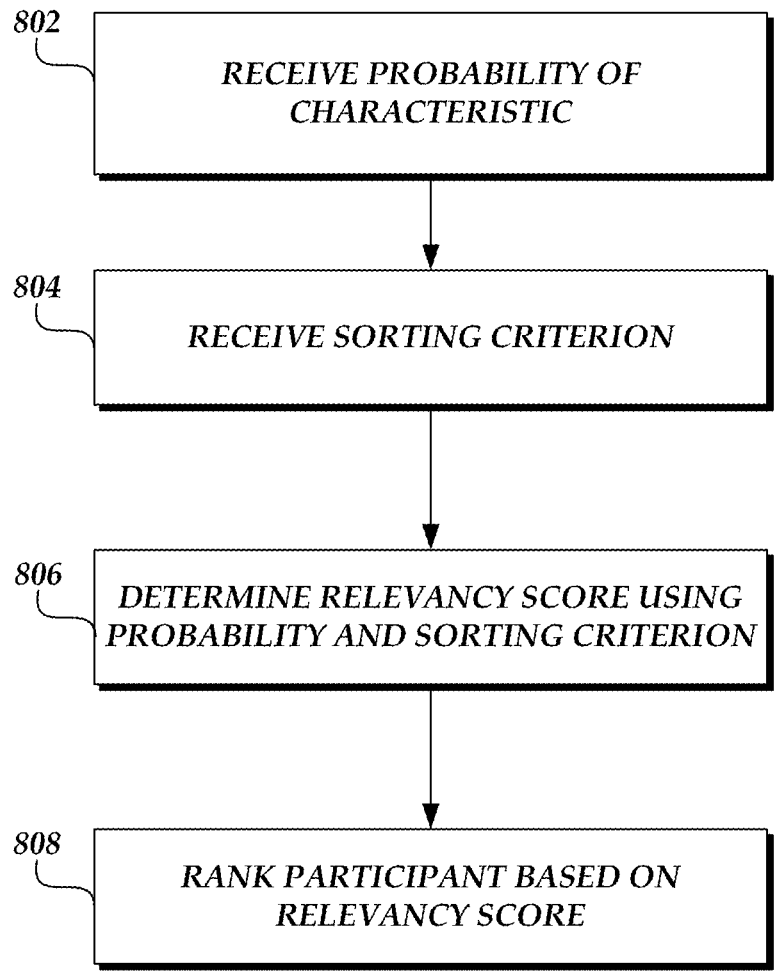
FIG. 8 is a flow diagram depicting an example routine for participant sorting and ranking within a video conference.

FIG. 8 is a flow diagram depicting an example routine 800 for participant sorting and ranking within a video conference. Routine 800 may be implemented by a computing device connected to video conference system 100.

At block 802, the computing device receives a probability that a characteristic is being experienced by a participant present in a video conference. In some examples, the probability may be determined according to the details outlined in block 706 of routine 700 and received by the computing device. In another example, the probability is determined by a different process than the one outlined in routine 700 and is received by computing device at block 802.

At block 804, the computing device receives a sorting criterion associated with a characteristic. In some examples, the characteristic may be an emotion or a level of engagement. A level of engagement may correspond to a participant's level of interaction and participation within the video conference. Emotions may correspond to a state of boredom, tiredness, excitement, interest, anger, disgust, fear, happiness, sadness, surprise, or apathy, of the participant.

At block 806, the computing device determines a relevancy score of the participant using the probability and the sorting criterion. The determination of the relevancy score may be accomplished according to block 708 of process 700.

At block 808, the computing device ranks the participant relative to other participants in the video conference based on the relevancy score. In some examples, the computing device may rank the participants from highest-scoring to lowest-scoring.

Figure 9:
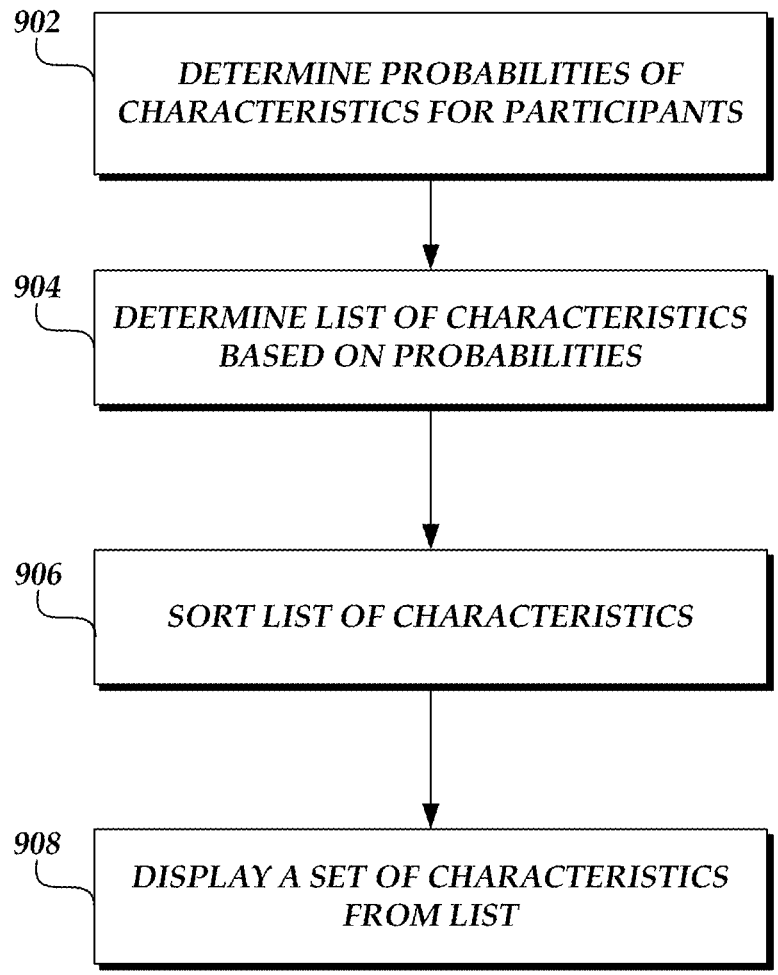
FIG. 9 is a flow diagram depicting an example routine for video conference meeting participant temperature.

FIG. 9 is a flow diagram depicting an example routine 900 for determining video conference participant temperature. "Temperature" as used herein refers to a general atmosphere generated by the mood of the participants. For example, a speaker giving a talk may gauge the "temperature" of the audience in order to adjust and effectively communicate. Routine 900 may be implemented by a computing device connected to video conference system 100.

At block 902, the computing device determines probabilities of characteristics being experienced by a set of participants in a video conference. In some examples, the computing device may determine a distinct probability for each participant of the set of participants. In some examples, the characteristic may be an emotion or a level of engagement. A level of engagement may correspond to a participant's level of interaction and participation within the video conference. Emotions may correspond to a state of boredom, tiredness, excitement, interest, anger, disgust, fear, happiness, sadness, surprise, or apathy, of the participant. For example, the computing device may determine that each participant in a video conference is exhibiting some degree of happiness, apathy, and tiredness. In this example, the computing device will determine a probability for each characteristic (happiness, apathy, tiredness) for each participant.

At block 904, the computing device determines a list of characteristics based on the probabilities. For example, the list may include all of the characteristics being experienced by participants in the video meeting. In some examples, the computing device may determine a list of characteristics based on the probabilities and a threshold value. In some examples, the threshold value may correspond to a value in which a characteristic is being experienced by a participant. For example, the list may include only the characteristics being experienced by a percentage of the participants.

At block 906, the computing device sorts the list of characteristics. In some examples, the list of characteristics may be sorted by frequency. For example, the characteristic most frequency experienced by At block 908, the computing device displays a set of characteristics from the sorted list. In some examples, the computing device may display a characteristic occurring most frequently in the sorted list. In some examples, the computing device may display a characteristic of the sorted list corresponding to a characteristic most likely being experienced by the largest number of participants in the video conference.

In some examples, the computing device may receive a selection of a characteristic from the set of characteristics. In this example, the computing device may display the set of characteristics in an order based upon the selection.

Figure 10:
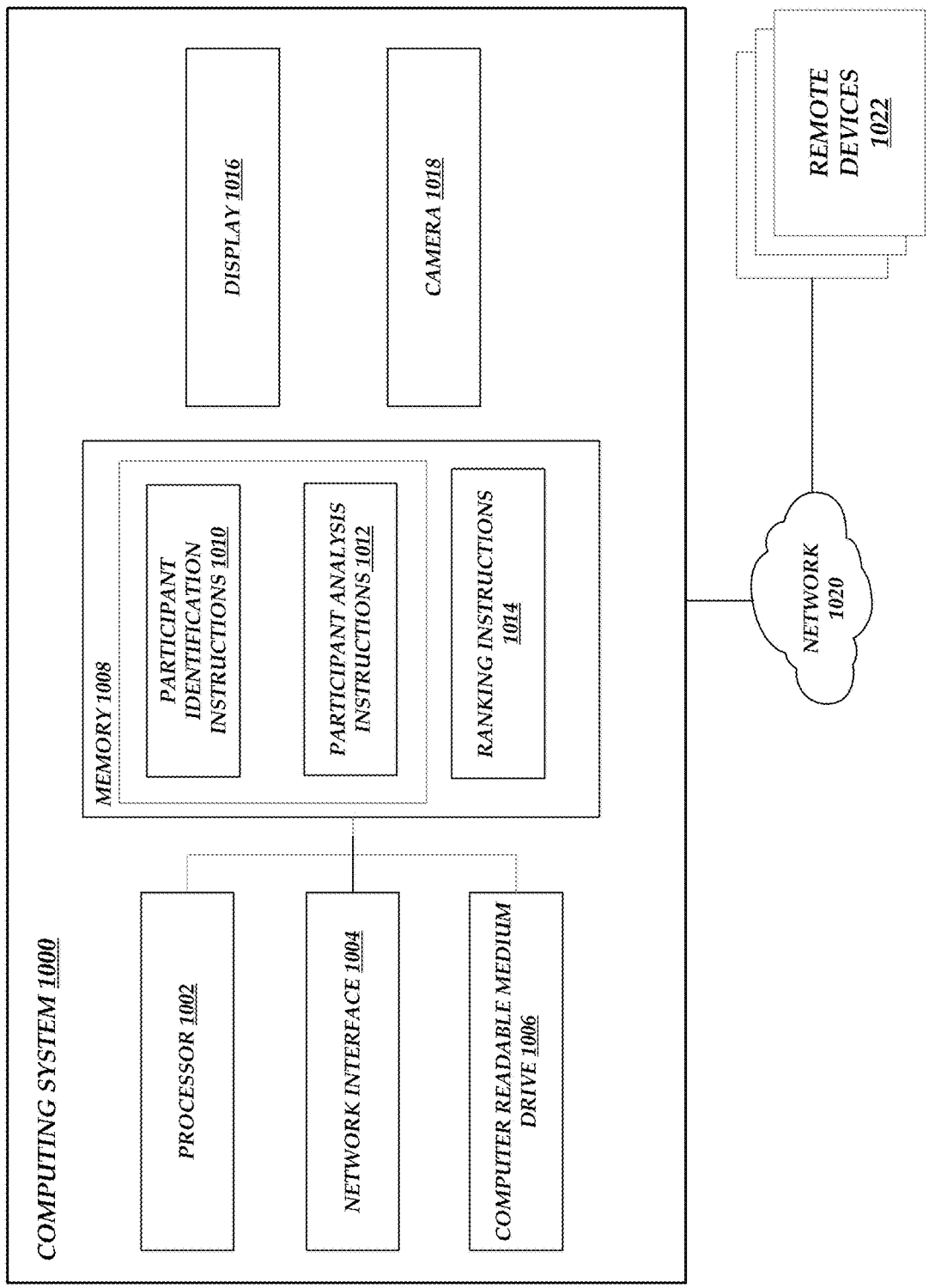
FIG. 10 is a block diagram illustrating components of a computing device to execute processes for managing participant sorting in a video conference.

FIG. 10 is a block diagram illustrating components of a computing device 1000 to execute processes for sorting conference participants in a video conference. As illustrated, FIG. 10 illustrates the various components of computing device 1000. In the illustrated example, computing device 1000 includes a processor 1002, such as a physical central processing unit ("CPU"); network interface 1004, such as a network interface card ("NIC"); computer readable medium drive 1006, such a high density disk ("HDD"), solid state drive ("SDD"), flash drives, and/or other persistent non-transitory computer-readable media; memory 1008, such as random access memory ("RAM") and/or other volatile non-transitory computer-readable media; display 1016; and camera 1018.

As illustrated, memory 1008 includes computer program instructions that processor 1002, i.e., a processing resource, executes in order to implement the methods and processes described herein. In the illustrated example, memory 1008 includes participant identification instructions 1010, participant analysis instructions 1012, and ranking instructions 1014. In an example, participant identification instructions 1010 may, when executed, direct the processor to coordinate with the participant identification engines and identify participants within their respective video feeds in video conference system 100. In an example, participant analysis instructions 1012 may, when executed, direct the processor to coordinate with the participant analysis engines to perform analysis on the participants. In an example, ranking instructions 1014 may, when executed, direct the processor to coordinate with the ranking engine 116 to perform ranking and sorting-related tasks. In some examples, the participant identification instructions 1010, participant analysis instructions 1012, and/or ranking instructions 1014 are not incorporated within the memory of the computing device 1000, but instead are provided by a remote service or server.

As illustrated, includes computing device 1000 is in communication with remote device(s) 1022 through network 1020. Remote device(s) 1022 may include any number of devices capable of hosting, attending, and/or otherwise participating in a video conference. In addition, a remote device 1022 may include a remote service, server, processor or other computing device to perform one or more video and/or imaging processing methods used by the video conference system 100. For example, the remote device 1022 may include an AI image processor that receives an image and returns the coordinates of faces or other relevant elements within the image. In some embodiments, the remote device 1022 includes an AI processor that receives a video feed and identifies the coordinates within the frames of the video feed that correspond to an active speaker (e.g., the person currently speaking during the video conference). Remote device(s) 1022 may include personal computing devices, laptop computing devices, tablet computing devices, electronic reader devices, wearable computing devices, mobile devices (e.g., cellular and other mobile phones, smart phones, media players, handheld gaming devices, etc.), streaming media devices, and various other electronic devices and appliances.

Network 1020 may be a private network, a publicly-accessible network of linked networks, possibly operated by various distinct parties, such as the Internet, or a combination of the two. In some cases, the network 1020 may be or include a private network, personal area network, local area network, wide area network, global area network, cable network, satellite network, cellular data network, etc., or a combination thereof, some or all of which may or may not have access to and/or from the Internet.

All of the processes described herein may be embodied in, and fully automated via, software code modules, including specific computer-executable instructions, which are executed by a computing system. The computing system may include at least one computer or processor. The code modules may be stored in any type of non-transitory computer-readable medium or other computer storage device. Some or all the methods may be embodied in specialized computer hardware.

Many other variations than those described herein will be apparent from this disclosure. For example, depending on the example, certain acts, events, or functions of any of the processes described herein can be performed in a different sequence, can be added, merged, or left out altogether (e.g., not all described acts or events are necessary for the practice of the process). Moreover, in certain examples, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, components and modules described in connection with the examples disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry to process computer-executable instructions. In another example, a processor includes an FPGA or other programmable device that performs logic operations without processing computer-executable instructions. A processor can also be implemented as a combination of computing devices, e.g., a combination of a DSP and a microprocessor, a plurality of microprocessors, at least one microprocessor in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might," or "may," unless specifically stated otherwise, are otherwise understood within the context as used in general to convey that certain examples include, while other examples do not include, certain features, elements, and/or blocks. Thus, such conditional language is not generally intended to imply that features, elements and/or blocks are in any way required for any examples or that any example necessarily includes logic for deciding, with or without user input or prompting, whether these features, elements, and/or blocks are included or are to be performed in any particular example.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Any process descriptions, elements or blocks in the flow diagrams described herein and/or depicted in the attached figures should be understood as potentially representing modules, segments, or portions of code which include executable instructions for implementing specific logical functions or elements in the process. Alternate implementations are included within the scope of the examples described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device to" are intended to include one or more recited devices. Such one or more recited devices can also collectively carry out the stated recitations. For example, "a processor to carry out recitations A, B, and C" can include a first processor to carry out recitation A working in conjunction with a second processor to carry out recitations B and C.

What is claimed is:

1. A non-transitory machine-readable storage medium comprising instructions executable by a processing resource of a computing device to cause the computing device to:
   receive a video feed of a participant in a video conference;
   identify the participant within the video feed;
   determine a probability that a characteristic is being experienced by the participant;

determine, for each frame of the video feed, a frame relevancy score of the participant based on the probability that the characteristic is being experienced by the participant;
determine an average relevancy score for the participant based on a combination of the probability that the characteristic is being experienced by the participant, a sorting criterion, and a weighted average of the frame relevancy scores over a predetermined interval; and
display the participant relative to other participants in the video conference based on the average relevancy score.

2. The non-transitory machine-readable storage medium of claim 1, wherein the instructions further cause the computing device to identify the participant using a multi-cascaded convolutional neural network (MTCNN).

3. The non-transitory machine-readable storage medium of claim 1, wherein the instructions further cause the computing device to determine the probability using a convolutional neural network (CNN).

4. The non-transitory machine-readable storage medium of claim 1, wherein the characteristic is selected from the group consisting of: an emotion and a level of engagement.

5. The non-transitory machine-readable storage medium of claim 1, wherein the characteristic is an emotion corresponding to a state of boredom, tiredness, excitement, interest, anger, disgust, fear, happiness, sadness, surprise, or apathy, of the participant.

6. The non-transitory machine-readable storage medium of claim 1, wherein the instructions cause the computing device to determine the probability using facial emotional analysis.

7. The non-transitory machine-readable storage medium of claim 1, wherein the instructions cause the computing device to determine the probability using hand gesture recognition.

8. The non-transitory machine-readable storage medium of claim 1, wherein the instructions further cause the computing device to determine the probability using head motion recognition.

9. The non-transitory machine-readable storage medium of claim 1, wherein the sorting criterion corresponds to a similar characteristic experienced by the other participants in the video conference.

10. A non-transitory machine-readable storage medium comprising instructions executable by a processing resource of a computing device to cause the computing device to:
receive a probability that a characteristic is being experienced by a participant present in a video feed of a video conference;
receive a sorting criterion associated with the characteristic;
determine, for each frame of the video feed, a frame relevancy score of the participant using the probability and the sorting criterion;
determine an average relevancy score for the participant based on the probability that the characteristic is being expressed by the participant, the sorting criterion, and the a weighted average of the frame relevancy scores over a predetermined interval;
rank the participant relative to other participants in the video conference based on the relevancy score; and
display the video feed of the participant relative to the other participants in the video conference based on the average relevancy score.

11. The non-transitory machine-readable storage medium of claim 10, wherein the characteristic is selected from the group consisting of: an emotion and a level of engagement.

12. The non-transitory machine-readable storage medium of claim 10, wherein the characteristic is an emotion corresponding to a state of boredom, tiredness, excitement, interest, anger, disgust, fear, happiness, sadness, surprise, or apathy, of the participant.

13. A non-transitory machine-readable storage medium comprising instructions executable by a processing resource of a computing device to cause the computing device to:
receive a video feed for each of a set of participants in a video conference;
determine probabilities of characteristics being experienced by the set of participants in the video conference, wherein a distinct probability is determined for each participant of the set of participants;
determine a list of characteristics based on the probabilities and a threshold value;
determine a relevancy score for each of the set of participants in the video conference based on the probabilities and the threshold value;
sort the list of characteristics and the set of participants based on the probabilities and the relevancy scores; and
display a set of characteristics and the set of participants based on the sorted list of characteristics.

14. The non-transitory machine-readable storage medium of claim 13, wherein the characteristic is selected from the group consisting of: an emotion and a level of engagement.

15. The non-transitory machine-readable storage medium of claim 13, wherein the characteristic is an emotion corresponding to a state of boredom, tiredness, excitement, interest, anger, disgust, fear, happiness, sadness, surprise, or apathy, of a participant.

16. The non-transitory machine-readable storage medium of claim 13, wherein the instructions further cause the computing device to receive a selection of a characteristic from the set of characteristics.

17. The non-transitory machine-readable storage medium of claim 16, wherein the instructions further cause the computing device to display the set of participants in an order based upon the selection.

18. The non-transitory machine-readable storage medium of claim 13, wherein the instructions further cause the computing device to display a characteristic of the sorted list corresponding to a characteristic most likely being experienced by the largest number of participants in the video conference.

19. The non-transitory machine-readable storage medium of claim 13, wherein the instructions further cause the computing device to display a characteristic occurring most frequently in the sorted list.

* * * * *